(12) United States Patent
Curtis

(10) Patent No.: US 10,852,079 B2
(45) Date of Patent: Dec. 1, 2020

(54) APPARATUS FOR COOLING LIQUID AND COLLECTION ASSEMBLY THEREFOR

(71) Applicant: Harold D. Curtis, Oklahoma City, OK (US)

(72) Inventor: Harold D. Curtis, Oklahoma City, OK (US)

(*) Notice: Subject to any disclaimer, the term of this patent is extended or adjusted under 35 U.S.C. 154(b) by 188 days.

(21) Appl. No.: 16/036,563

(22) Filed: Jul. 16, 2018

(65) Prior Publication Data

US 2019/0024992 A1 Jan. 24, 2019

Related U.S. Application Data

(60) Provisional application No. 62/633,785, filed on Feb. 22, 2018, provisional application No. 62/604,844, filed on Jul. 24, 2017.

(51) Int. Cl.
*B01F 3/04* (2006.01)
*F28F 25/04* (2006.01)
*F28C 1/02* (2006.01)
*F28F 25/06* (2006.01)
*F28F 25/00* (2006.01)

(52) U.S. Cl.
CPC .......... *F28F 25/04* (2013.01); *B01F 3/04049* (2013.01); *B01F 3/04078* (2013.01); *F28C 1/02* (2013.01); *F28F 25/06* (2013.01); *F28F 2025/005* (2013.01)

(58) Field of Classification Search
CPC .... F28F 25/04; F28C 1/02; B01F 3/04; B01F 3/04049; B01F 3/04078
See application file for complete search history.

(56) References Cited

U.S. PATENT DOCUMENTS

| | | | |
|---|---|---|---|
| 1,647,281 A | 11/1927 | Doyle | |
| 1,803,854 A | 5/1931 | Kniskern | |
| 1,866,193 A | 7/1932 | Coutant | |
| 2,606,008 A * | 8/1952 | Lau Bach | F28C 1/14 261/151 |
| 3,217,631 A | 11/1965 | Thompson et al. | |
| 3,290,025 A | 12/1966 | Engalitcheff, Jr. | |
| 3,384,165 A | 5/1968 | Mathews | |
| 3,402,653 A | 9/1968 | Lex | |
| 3,647,191 A | 3/1972 | Fordyce | |

(Continued)

FOREIGN PATENT DOCUMENTS

EP 0931993 A1 7/1999
WO 99/19055 A1 4/1999

(Continued)

*Primary Examiner* — Robert A Hopkins
(74) *Attorney, Agent, or Firm* — Dunlap Codding, P.C.

(57) ABSTRACT

An apparatus has a housing with at least one gutter, a body of fill material disposed in the housing, a liquid distribution system disposed in the housing and positioned above the fill material, a fan positioned below the body of fill material for blowing air upward through the fill material, a liquid collection assembly positioned between the fill material and the fan for collecting the liquid gravitating through the fill material. The liquid collection assembly has at least one troughless, open sided surface element angled so gravity is utilized to capture the down flowing liquid to provide a barrier between the fill media and the fan and to carry the liquid down the surface element and into the at least one gutter.

23 Claims, 16 Drawing Sheets

(56) References Cited

U.S. PATENT DOCUMENTS

| | | |
|---|---|---|
| 3,750,418 A | 8/1973 | Maudlin |
| 3,803,997 A | 4/1974 | Van Raden |
| 3,834,129 A | 9/1974 | Darlinger et al. |
| 3,968,738 A | 7/1976 | Matzke |
| 4,014,669 A | 3/1977 | Thompson et al. |
| 4,164,399 A | 8/1979 | Kannapell |
| 4,196,157 A | 4/1980 | Schinner |
| 4,198,215 A | 4/1980 | Regehr |
| 4,273,733 A | 6/1981 | Kals |
| 4,416,835 A | 11/1983 | Bosne |
| 4,500,330 A | 2/1985 | Bradley, Jr. et al. |
| 4,521,350 A | 6/1985 | Lefevre |
| 4,759,315 A | 7/1988 | Chiou et al. |
| 4,981,113 A | 1/1991 | Kannan et al. |
| 5,000,883 A | 3/1991 | Leva |
| 5,227,095 A * | 7/1993 | Curtis ............... F28C 1/02 261/111 |
| 5,268,011 A | 12/1993 | Wurz |
| 5,474,832 A | 12/1995 | Massey |
| 5,487,531 A | 1/1996 | Curtis |
| 5,545,356 A | 8/1996 | Curtis |
| 5,958,306 A | 9/1999 | Curtis |
| 6,527,258 B2 | 3/2003 | Bartlok |
| 8,585,024 B2 | 11/2013 | Ferree et al. |
| 9,033,318 B2 | 5/2015 | Curtis |
| 9,644,904 B2 | 5/2017 | Curtis |
| 2006/0021393 A1 | 2/2006 | Oda et al. |
| 2007/0187851 A1 | 8/2007 | Facius et al. |
| 2011/0049733 A1 | 3/2011 | Ferree et al. |
| 2014/0361450 A1 | 12/2014 | Curtis |
| 2015/0330710 A1 | 11/2015 | Curtis |
| 2016/0146540 A1 | 5/2016 | Curtis |

FOREIGN PATENT DOCUMENTS

| | | |
|---|---|---|
| WO | 2004/072569 A1 | 8/2004 |
| WO | 2009/070691 A1 | 6/2009 |

* cited by examiner

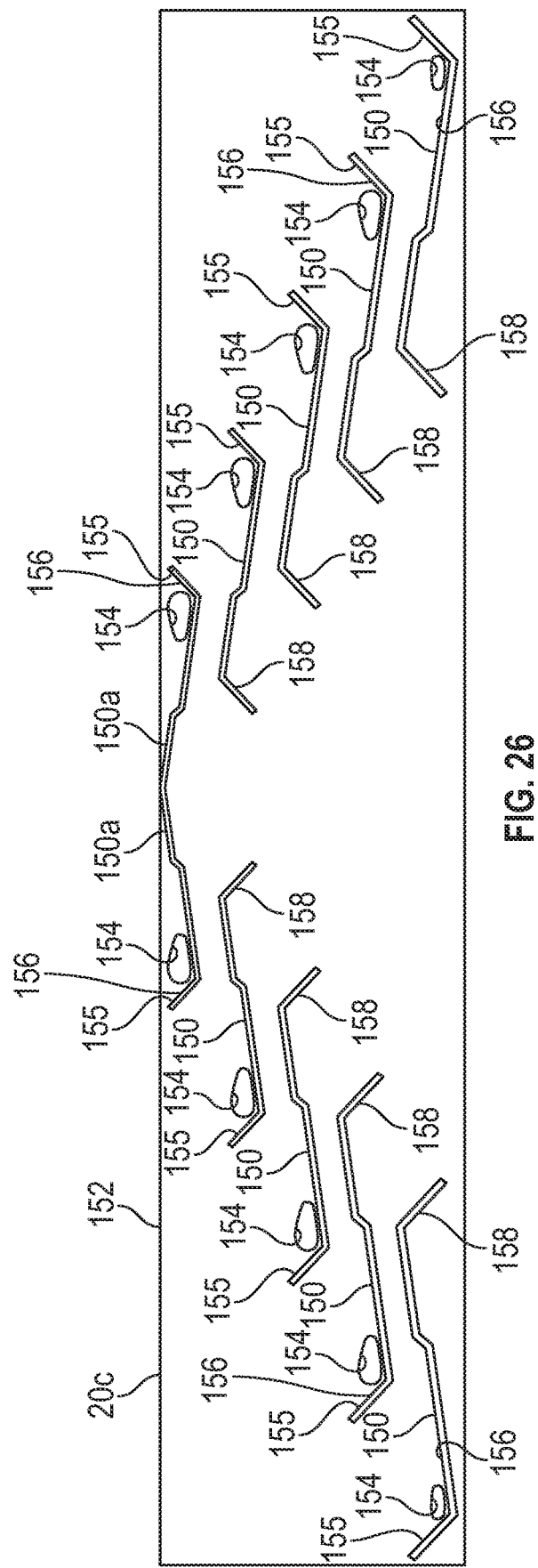

APPARATUS FOR COOLING LIQUID AND COLLECTION ASSEMBLY THEREFOR

CROSS-REFERENCE TO RELATED APPLICATIONS

This application claims priority to U.S. Provisional Application Ser. No. 62/633,785, filed Feb. 22, 2018, and to U.S. Provisional Application Ser. No. 62/604,844, filed Jul. 24, 2017, the entire contents of each being hereby expressly incorporated herein by reference.

BACKGROUND

Conventional types of industrial cooling towers include counter flow towers wherein water or other liquid falls or is sprayed downward in the tower counter to air moving upwardly in the tower. Such systems are used for many applications including water air scrubbers, dust collection equipment, air cooling towers, evaporative coolers, fluid coolers or closed loop cooling towers, evaporative condensers or the like. Typically such industrial cooling towers are large and permanent installations which include large bottom sumps to collect the falling water.

Some relatively small towers for such purposes have been built which are transportable, for various applications, such as small rooftop towers. For example, U.S. Pat. Nos. 5,227,095 and 5,487,531, issued to Harold D. Curtis, disclose individual modular towers of a size that can be readily transported, prefabricated at a factory, and then easily assembled at a field site to provide the capacity required by the particular water/liquid cooling or treatment project at the site. The systems disclosed in the Curtis patents have a fan or fans for supplying air to the tower in the bottom of the tower below the fill, evaporative cooling media, or liquid cooling coils. The fans force air directly upward in the tower. These systems are referred to generally as direct forced draft counter flow cooling towers.

Each system uses a large water or liquid collection basin, sump or reservoir to collect and contain the circulating water for the system. These basins or sumps are typically large because they must contain enough liquid to charge the system, including all associated piping. Because the process liquid (often, but not always, water) in these systems will scrub the air and collect airborne particles, such particles will settle out in the basins, sumps or reservoirs which then have to be periodically cleaned and the large volume of liquid in the system dumped, cleaned or disposed of. Such basins, sumps and reservoirs become internal sediment basins. Such basins are maintenance intense and require workers to enter and work in a confined space to perform cleaning. Simultaneously the large volume of liquid itself may require water or chemical treatment rather than disposal, further adding to costs. The volume of liquid in such systems greatly increases the weight of the system and increases rooftop loading.

Besides the issues of sedimentation, liquid volume and disposal, proposed tower systems have not adequately addressed the problem of air diffusion by their respective liquid collection systems. Generally, cooling tower (or other forms of towers like fluid coolers) efficiency is determined by how well the up flowing air is mixed with the down coming liquid. The fans in such systems are round and the air is not evenly distributed across the tower media or elements since the fans deliver no balanced air flow. Collection systems generally include a plurality of collection troughs. Sometimes, the troughs have a sloping plate member which overlaps with adjacent plate members. Such an arrangement limits, if not blocks, air flow on the wall areas of the tower and causes the air to enter the fill media, or heat exchange fluid cooler coils above it, at an angle which forces much of the air to one side of the tower or housing. These collection troughs are typically supported in the tower housing by transverse support members or plates which block or limit air dispersion through them and prevent lateral dispersion of air between them.

While troughs are effective for collecting water, the sides of a trough create a barrier for passing air across the water collected in the trough. Because of the barrier formed by the side walls of the trough, air does not efficiently pass across the water to continue effecting cooling after the water is collected in a trough. This affects the quality and dispersion of the air entering the tower and reduces thermal performance of the tower.

SUMMARY OF THE INVENTIVE CONCEPTS

In accordance with an aspect of the inventive concepts low profile, transportable cooling towers and/or fluid coolers/closed loop cooling towers are disclosed which include a liquid collection assembly located above one or more fans in the base of the tower housing. The liquid collection assembly is positioned below the fill media in the tower or heat transfer coils of a fluid cooler. It collects the liquid flowing through the fill or heat transfer coils and directs the same to an internal gutter, from which the liquid may be removed and recirculated.

In accordance with a further aspect of the inventive concepts a liquid collection assembly is provided which is formed from at least one troughless, open sided surface element. In one embodiment, the surface elements are elongated, open sided members that provide one or more planar or curved surfaces on which liquid falls and adheres to due to surface tension. The surface elements are angled so gravity is utilized to carry the liquid down the surface elements and into one of the gutters. The surface elements in each layer are offset from the surface elements in the layers above or below it to capture the down flowing liquid in the tower to provide a barrier between the fill media or heat exchanger and the fans while producing a uniform diffusion of air flowing upwardly.

The liquid collection assembly can be utilized in equipment such as water air scrubbers, dust collection equipment, cooling towers, evaporative coolers, fluid coolers, evaporative condensers and any equipment that utilizes water or any liquid fluid for scrubbing, cleaning, or evaporative cooling. Although the liquid collection assembly is described for use with low profile transportable cooling towers and/or fluid coolers, the liquid collection assembly can be used with any systems, including those having conventional bottom sumps and basins.

Besides collecting the down coming liquid, the liquid collection assembly provides a low-pressure means for the air to flow vertically up between the surface elements of the liquid collection assembly and into the cooling media or fluid cooler coil system. The surface elements are strategically positioned to direct and defuse the up flowing air to enhance even airflow through the liquid collection assembly and the fill media or heat exchanger. The structure of the surface elements allows air to disperse uniformly. This creates an efficient air to liquid mixture, improving thermal performance of the heat exchanger or cooling tower. In addition, previously proposed liquid collectors have a significant pressure drop across the collector panels. The inventive concepts described herein will reduce the pressure drop as compared to the existing technology. This will further increase thermal performance of the heat exchanger or cooling tower. The liquid collection assembly can be produced much more economically than the present technology.

Utilizing the liquid collection assembly with forced draft air systems containing fans mounted in the bottom of the towers provides several advantages. The fans operate outside of the wetted air system and below the tower structure which protects the fans from the natural elements. This feature greatly reduces fan maintenance cost and extends the fans' serviceable life. Also, the fans are accessible and can be serviced and/or removed from below the unit with no service personnel having to enter the environmentally unfriendly wetted areas of the equipment. This feature will also greatly reduce maintenance cost and not expose service personnel to any unnecessary health risks.

BRIEF DESCRIPTION OF THE DRAWINGS

FIG. 26 is a sectional view of another liquid collection assembly.

DETAILED DESCRIPTION OF EXEMPLARY EMBODIMENTS

Figure 2:
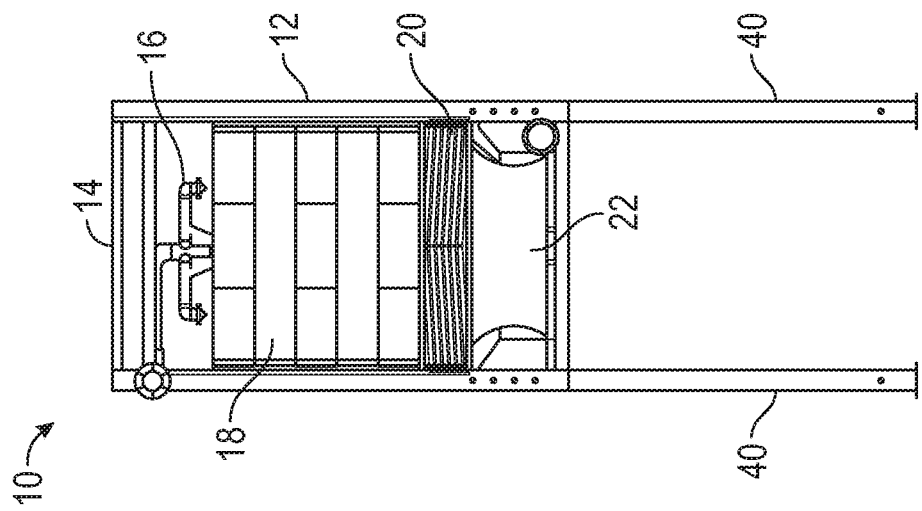
FIG. 2 is an end view of the cooling tower module of FIG. 1.

Before explaining at least one embodiment of the inventive concepts disclosed, it is to be understood that the inventive concepts are not limited in their application to the details of construction and the arrangement of the components or steps or methodologies in this description or illustrated in the drawings. The inventive concepts disclosed are capable of other embodiments or of being practiced or carried out in various ways. Also, it is to be understood that the phraseology and terminology employed is for description only and should not be regarded as limiting the inventive concepts disclosed and claimed herein.

In this detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features may not be described to avoid unnecessarily complicating the disclosure.

Further, unless stated to the contrary, "or" refers to an inclusive "or" and not to an exclusive "or." For example, a condition A or B is satisfied by anyone of: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts disclosed. This description should be read to include one or at least one and the singular also includes the plural unless it is obvious that it is meant otherwise.

As used herein any reference to "one embodiment" or "an embodiment" means that a particular element, feature, structure, or characteristic described in the embodiment is included in at least one embodiment. The appearances of the phrase "in one embodiment" in various places in the specification are not necessarily all referring to the same embodiment.

Figure 1:
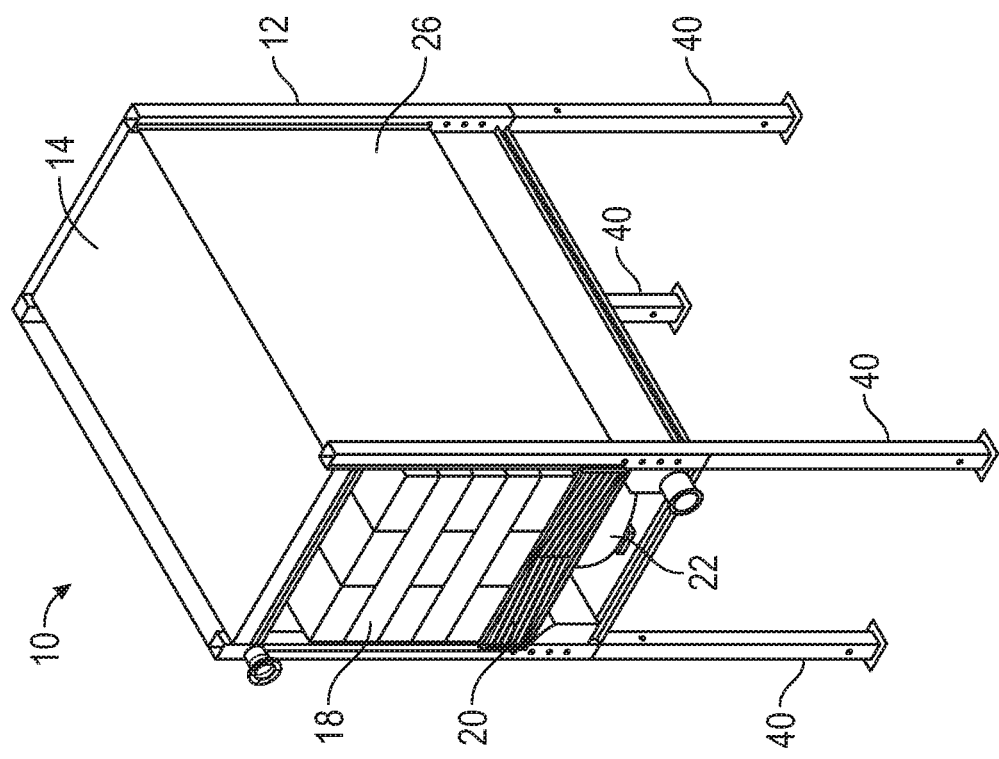
FIG. 1 is a perspective view of a cooling tower module constructed in accordance with the inventive concepts disclosed herein.
Figure 3:
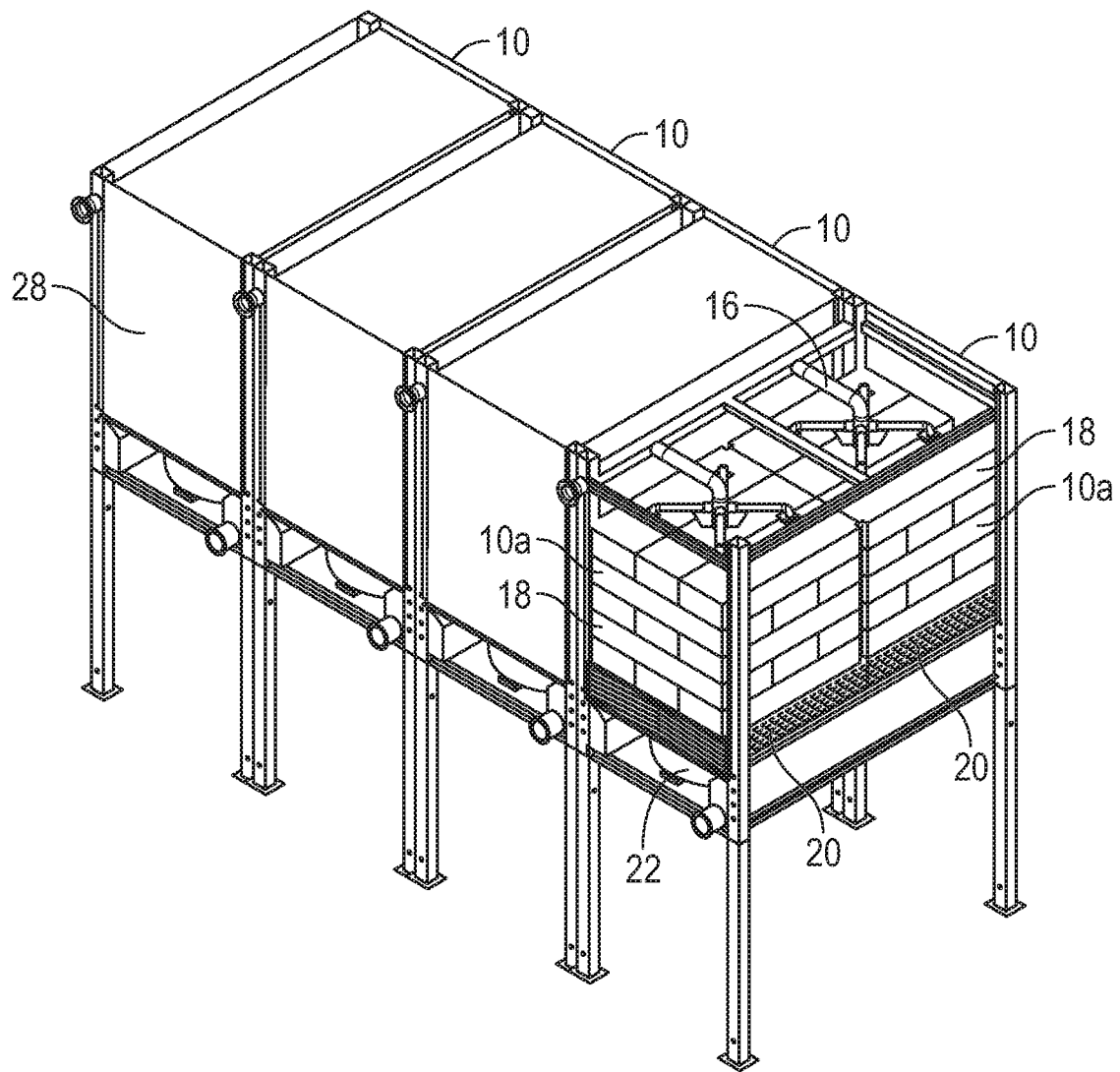
FIG. 3 is a perspective view of an assembly of multiple cooling tower modules.

Referring to the drawings, and more particularly to FIGS. 1-3, a cooling tower module 10 constructed in accordance with the inventive concepts disclosed herein is shown. The cooling tower module 10 includes a housing assembly 12, drift eliminators 14, liquid distribution assemblies 16, fill media 18, liquid collection assemblies 20, and fan assemblies 22 for drawing air through the bottom of the housing assembly 12 and blowing it through the liquid collection assemblies 20, the fill media 18, the drift eliminators 14, and out the top of the housing assembly 12 countercurrent to the water distributed from liquid distribution assemblies 16.

FIG. 3 shows the cooling tower module 10 combined with three other cooling tower modules 10. Any number of cooling tower modules can be combined to form a cooling tower of desired capacity. In one embodiment, the cooling tower module 10 may be formed to a size of 6 ft. by 12 ft.

by 11 ft. Each module can include two sub-modules 10a. The sub-modules 10a may be arranged in a side-by-side relationship and each sub-module 10a may include a drift eliminator 14, a liquid distribution assembly 16, a fill media 18, a liquid collection assembly 20, and a fan assembly 22. The sub-modules 10a may have a size of 6 ft. by 6 ft. by 11 ft. with each sub-module having a cooling capacity of 100 tons.

Figure 4:
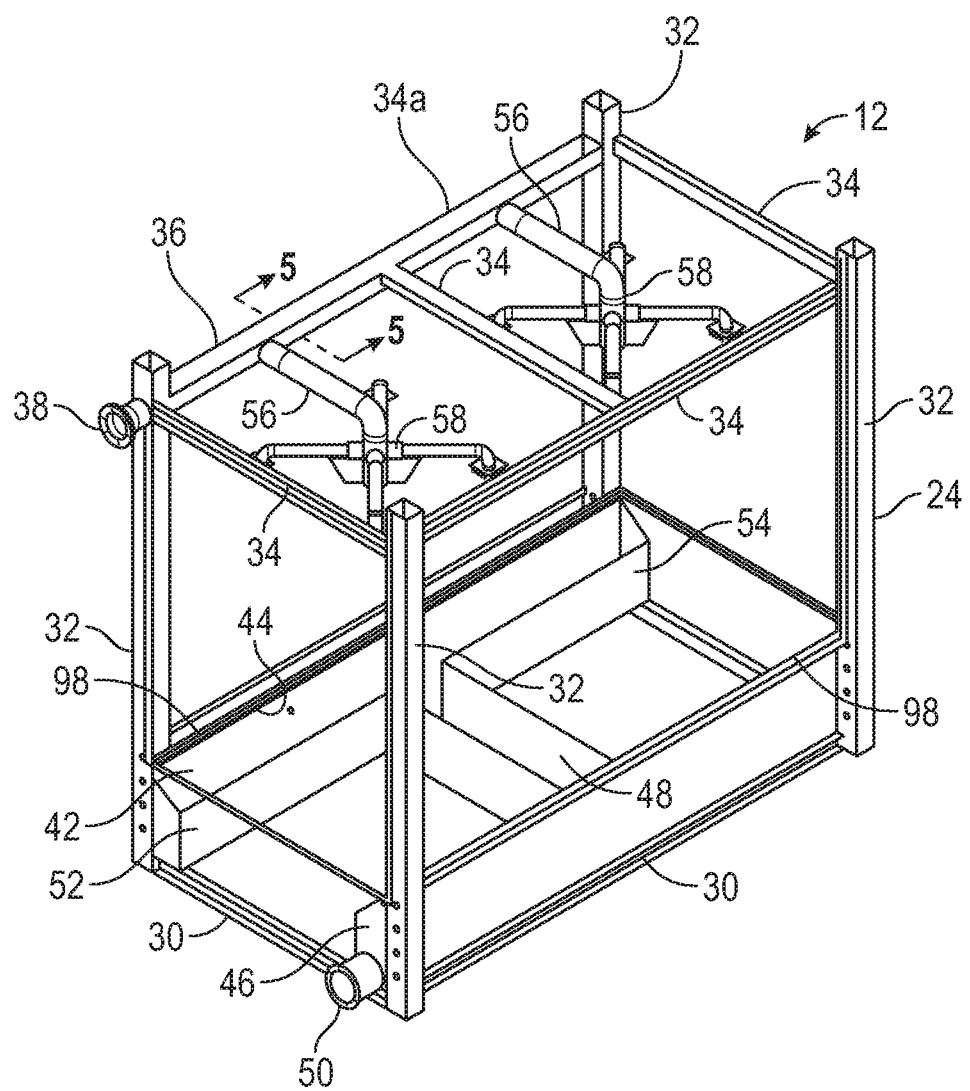
FIG. 4 is a perspective view of a frame assembly and a liquid distribution assembly.
Figure 5:
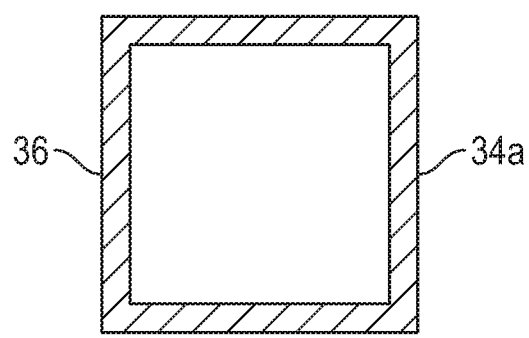
FIG. 5 is a sectional view taken along line 5-5 of FIG. 4.
Figure 6:
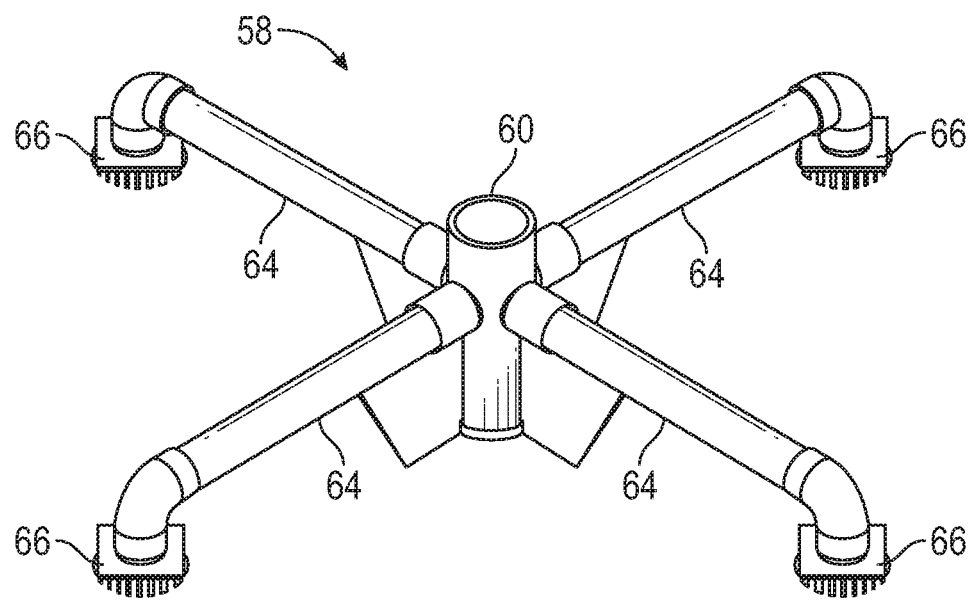
FIG. 6 is a perspective view of a four-plex header assembly.
Figure 7:
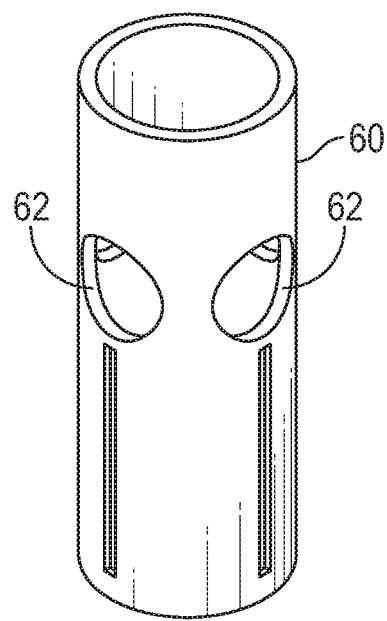
FIG. 7 is a perspective view of a base header.
Figure 8A:
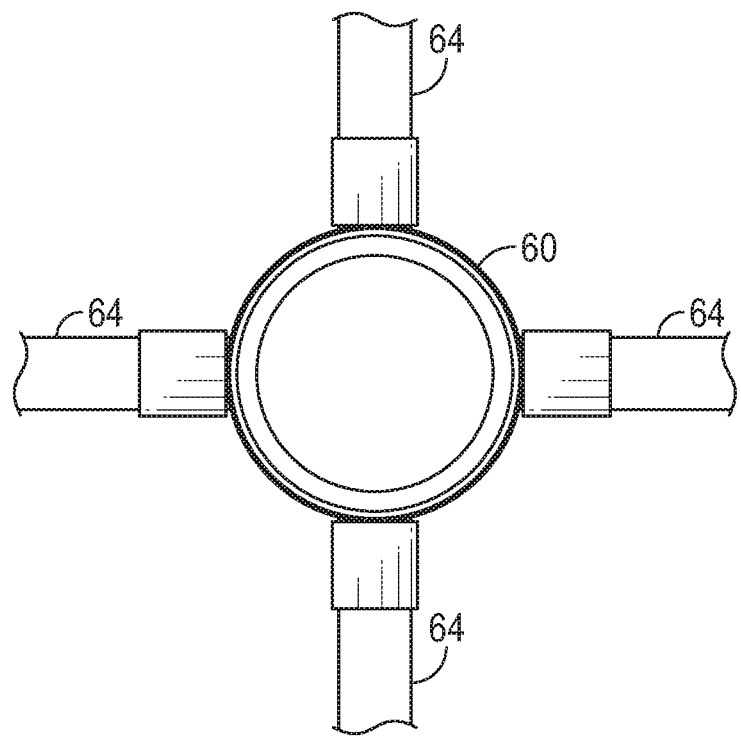
FIGS. 8A-8D are sectional views showing different positions of lateral conduits relative to the base header.
Figure 8B:
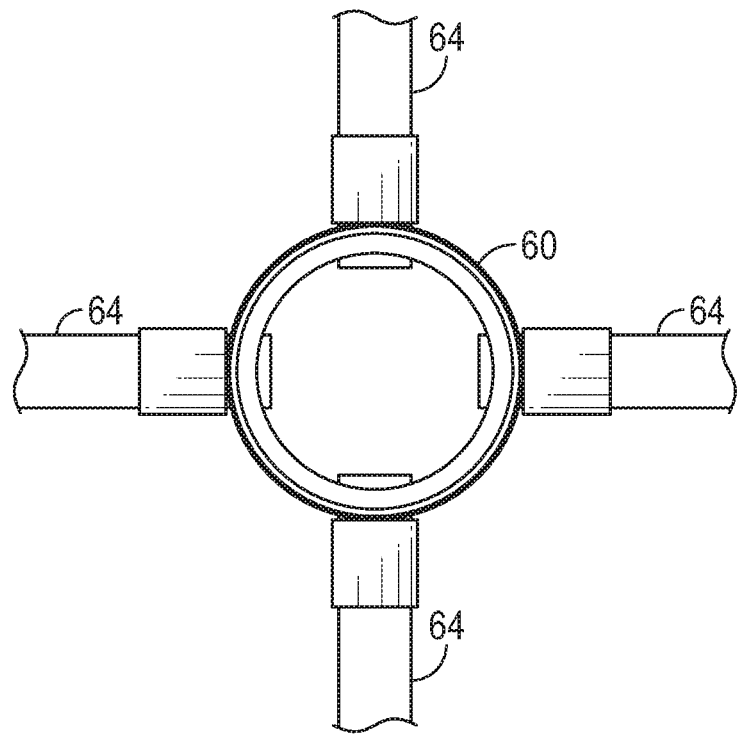
Figure 8C:
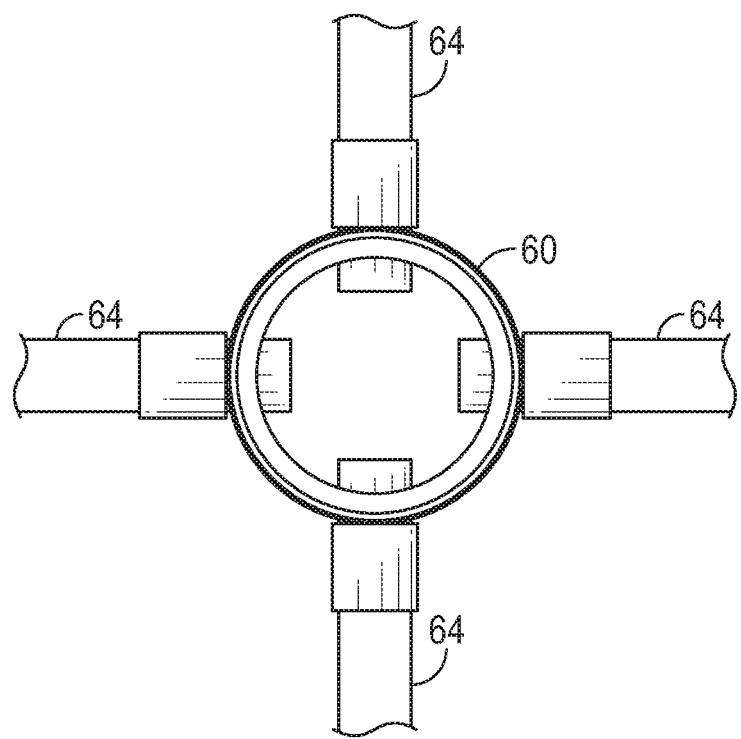
Figure 8D:
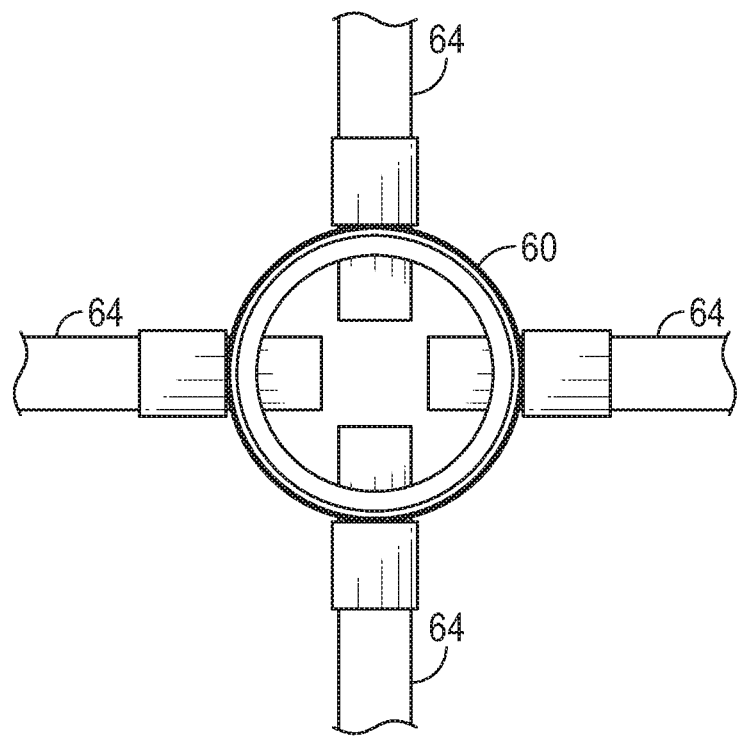

Referring to FIGS. 4 and 5, the housing assembly 12 includes a frame 24 supporting vertical side walls 26 and end walls 28. One of the end walls 28 has been removed to illustrate the interior of the cooling tower module 10. The frame 24 includes a plurality of lower horizontal beams 30, a plurality of vertical beams 32, and a plurality of upper horizontal beams 34 connected together to form a generally rectangular-shaped support frame. The beams 34 may be fabricated of any suitable material, including metal or pultruded fiberglass. When the cooling tower module 10 is combined with another cooling tower module 10, the adjacent side walls can be omitted so the cooling tower modules 10 openly communicate with one another.

One of the upper horizontal beams 34a may be constructed to be a liquid distribution header 36 for the liquid distribution assembly 20 in a manner described below. The beam 34a is formed as liquid conduit (FIG. 5) and is sealed relative to the adjacent vertical beams 32. One end of the beam 34a is provided with liquid inlet 38. In one embodiment, the liquid inlet 38 is a flange.

As seen in FIGS. 1 and 2, the frame 24 is supported by four legs 40 at the corners of the frame 24. The legs 40 are telescopically connected to the vertical beams 32.

The housing assembly 12 further includes a liquid collection basin 42. The liquid collection basin 42 is formed to collect water from the liquid collection assembly 20 as described below. The liquid collection basin 42 may include a first gutter 44 extending along an interior side of one of the longitudinal lower horizontal beams 30 and a second gutter 46 extending along an interior side of the other longitudinal lower horizontal beam 30. The first gutter 44 and the second gutter 46 may be fluidly connected with a connecting gutter 48. The gutters 44, 46, and 48 cooperate to form a first fan receiving space 50 and a second fan receiving space 52. One of the first and the second gutters 44 and 46 is provided with a liquid outlet 54. In one embodiment, the liquid outlet 54 is a flange.

Referring now to FIGS. 4-8, in one embodiment the liquid distribution assemblies 16 include at least one feeder conduit 56 and a four-plex header assembly 58. One end of the feeder conduit 56 is connected to the liquid distribution header 34a and an opposing end of the feeder conduit 56 is connected to the four-plex header assembly 58. The four-plex header assembly 58 has a central base header 60. In one embodiment, the central base header 60 can have a diameter in a range of 6 in. to 8 in. The base header 60 may have four holes 62 equally spaced about the circumference of the base header 60. The holes 62 are sized to receive lateral conduits 64. In one version, the diameter of the holes 62 may be 2 inches. The feeder conduit 56, the base header 60, and the lateral conduits 64 may be made of any suitable material such as PVC, RFP, copper, stainless steel, aluminum, and resins, for example.

The four-plex header assembly 58 further has a plurality of nozzle assemblies 66. The nozzle assemblies 66 are connected to the lateral conduits 64 and are in fluid communication with the lateral conduits 64. The nozzle assemblies 66 function to discharge water therethrough to obtain a uniform distribution of water over the fill media 18. The nozzle assemblies 66 may be any suitable nozzle assemblies. For example, a suitable nozzle assembly is disclosed in U.S. Publication No. 2017/0297043, which is hereby expressly incorporated herein by reference.

Due to friction losses in piping, turns, and distance from the pump source, the conduits 64 and nozzle assemblies 66 are not equally pressured. This results in uneven water loading over the fill material 18. The liquid distribution assembly 16 permits the water pressure to the nozzle assemblies 66 to be selectively adjusted. The lateral conduits 64 are connected to the base header 60 so the position of the lateral conduits 64 relative to the base header 60 is adjustable. As shown in FIGS. 8A-8D, the end of each of the lateral conduits 64 may be positioned within the base header 60. The deeper within the base header 60 the end of the lateral conduits 64 is positioned, the greater the pressure created. As such, the pressure to each nozzle assembly 66 may be adjusted to provide balanced water loading.

The drift eliminators 14 are mounted in the open top of the housing assembly 12 to intercept, trap, and collect mist blown through the housing assembly 12 to prevent the mist from escaping to the atmosphere. Drift eliminators are well known in the art and need not be described.

The fill material 18 may be any suitable fill media. In one embodiment, the fill material may be formed from a plurality of layers. For example, the fill material 18 may be corrugated plastic fill material. Like the drift eliminators, the fill media is well known in the art and need not be described.

Referring now to FIGS. 1 and 9-13, the liquid collection assembly 20 is positioned within the housing assembly 12 below the fill media 18 for collecting liquid that passes from the liquid distribution assembly 16 and through the fill media 18. The liquid collection assembly 20 includes a perimeter housing 70, which defines a vertical flow passage 72, and a plurality of surface elements 74 supported within the flow passage 72 to allow air to pass from the fan assembly 22 and through the flow passage 72 and to collect liquid falling into the flow passage 72 and to direct the collected water to the first and second gutters 44 and 46. The perimeter housing 70 has a pair of sidewalls 75a and a pair of end walls 75b. One of the end walls 75b has been omitted to show the surface elements.

Figure 11:
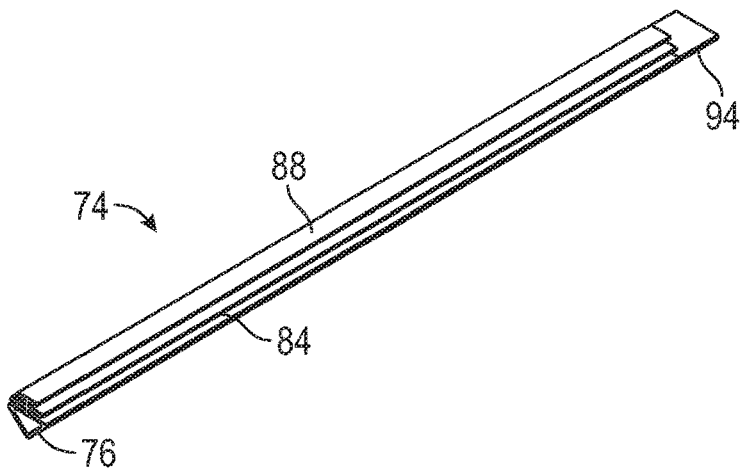
FIG. 11 is a perspective view of a surface element.
Figure 12A:
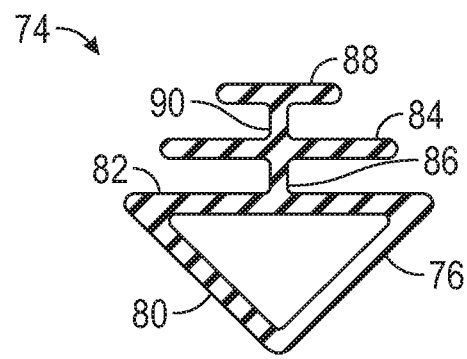
FIGS. 12A-12C are sectional views of the surface element of FIG. 11.
Figure 12B:
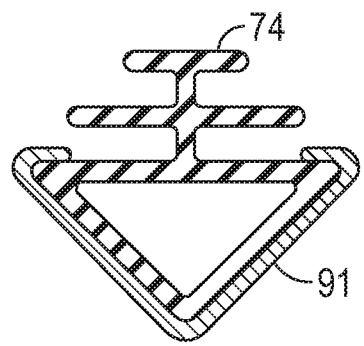
Figure 12C:
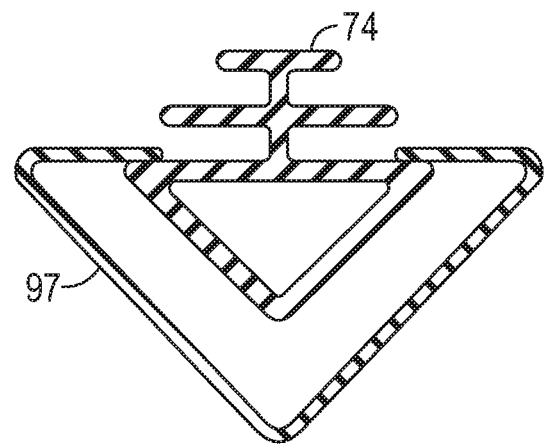

As best shown in FIGS. 11 and 12A, the surface elements 74 are elongated, open sided members that provide one or more planar surfaces on which liquid falls and adheres due to surface tension. The surface elements 74 are angled so gravity is utilized to carry the liquid down the surface elements 74 and into one of the gutters 44 or 46. In one embodiment, the surface elements 74 include an air diverter 76 and one or more plates. The air diverter 76 is shown to have a generally triangular shape with a V-shaped lower surface 80 and a planar upper surface 82. A first plate 84 is connected to the upper end of the air diverter 76 in a spaced relationship with a web 86. The first plate 84 has a width that is less than the width of the upper end of the air diverter 76. A second plate 88 is connected to the first plate 84 in a parallel, spaced relationship with a web 90. The second plate 88 has a width that is less than the width of the first plate 84. The surface elements 74 may be fabricated of a metal or sufficiently rigid plastic material. If fabricated of a plastic material, the surface element 74 may further include a fireproof cover 91 (FIG. 12B) shaped to conform to the contour of the air diverter 76. The cover 91 can be fabricated of a metal.

While the air diverter 76, the first plate 84, and the second plate 88 have been shown to have planar surfaces, these structures may be formed to have other shapes. For example, the lower surface of the air diverter may be U-shaped. Also, one or more of the upper surface of the air diverter and the upper and lower surfaces of the first plate and the second plate may be curved to have a convex or circular shape. Also, the webs are continuous along the length of the surface elements. The webs may include spaced apart openings to create additional flow passages.

In another embodiment, the surface element may include only the air diverter, the air diverter with any number of plates, a single plate without the air diverter, or two or more plates without the air diverter.

Figure 9:
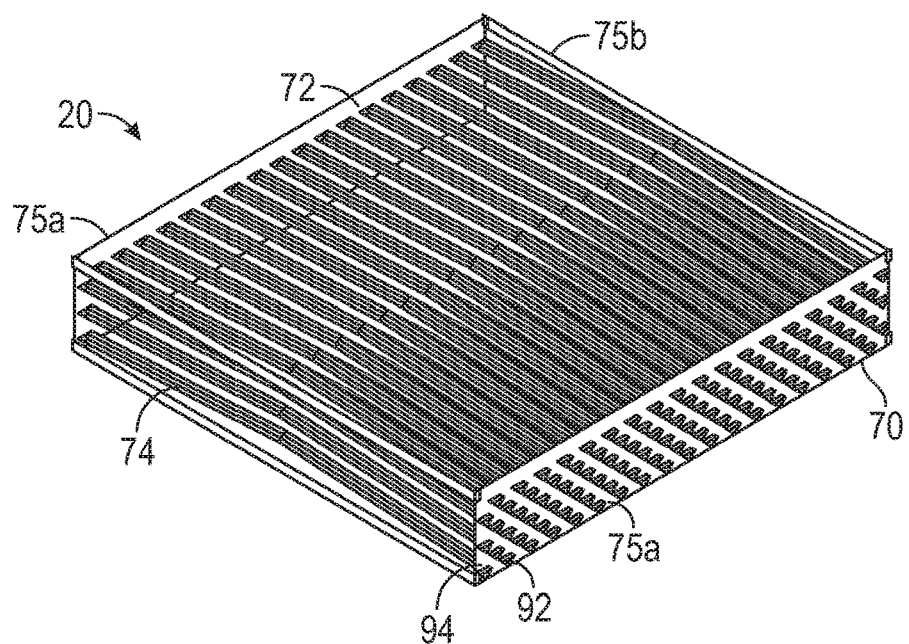
FIG. 9 is a perspective view of a liquid collection assembly constructed in accordance with the inventive concepts disclosed herein.
Figure 10:
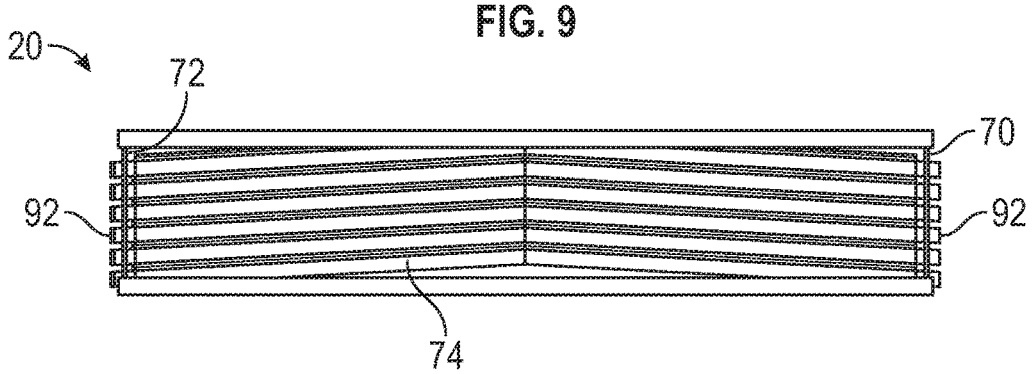
FIG. 10 is an elevational view of the liquid collection assembly.

Water collects on the surface elements 74 due to surface tension between the liquid and the surface elements 74. To utilize gravity to carry the liquid to the first gutter 44 and the second gutter 46, the surface elements 74 are angled down toward at least one of the side walls 75a. As shown in FIGS. 9 and 10, the surface elements 74 are supported and arranged in an inverted V so that liquid collected on one side of the V is carried toward one gutter and liquid collected on the other side is carried toward the other gutter. Desirably, the surface elements 74 require no intermediate support, which would interfere with the flow of air and liquid through the cooling tower module 10.

In another embodiment, the surface elements 74 may be supported and arranged so the surface elements 74 angle downwardly from one side wall to the opposing side wall. Here, liquid will enter the liquid basin via only one gutter.

The surface elements 74 may be arranged in multiple layers. The surface elements 74 collect the liquid passing through the flow passage 72 to intercept the liquid and direct it away from the fan assemblies 22. As illustrated in FIGS. 9 and 10, the ends of the surface elements 74 are connected to the side walls 75a so the liquid traveling down the surface elements 74 contacts the side walls 75a and falls into the gutters 44 and 46, which are positioned beneath the side walls 75a. The gutters 44 and 46 carry the liquid to the outlet 54 where it can be recirculated. In one embodiment, the surface elements 74 have a protrusion 94 formed at a distal end thereof that is received in a corresponding shaped opening 96 formed in the end walls 75b.

Figure 13:
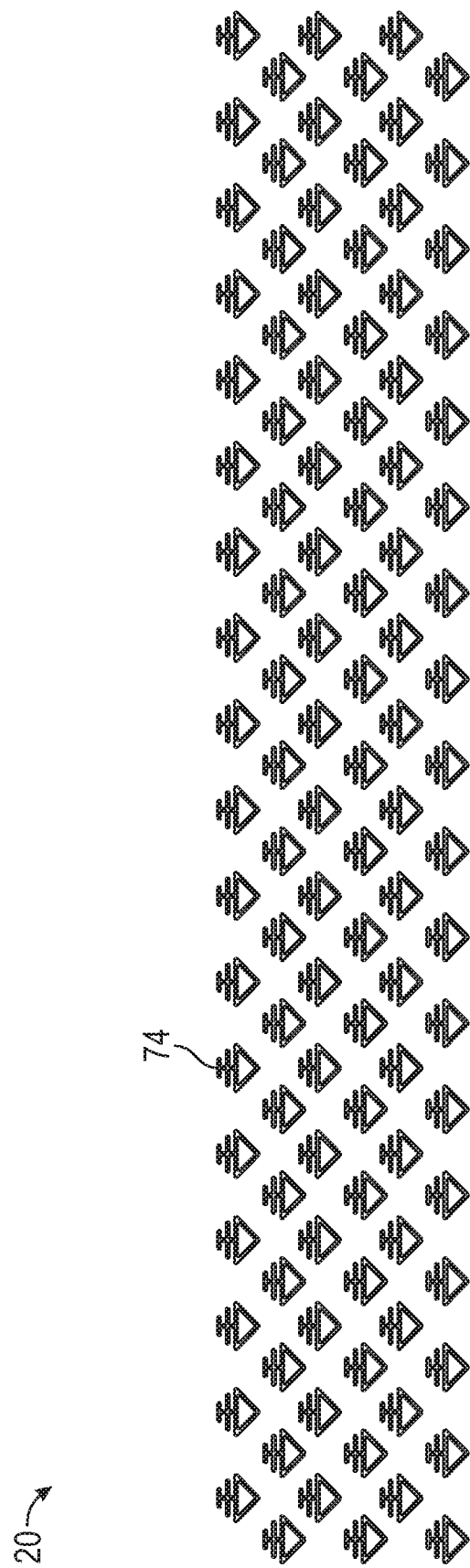
FIG. 13 is a schematic illustration of an array of surface elements.

Referring now to FIG. 13, shown is a schematic illustration of the array of the surface elements 74. The air flowing from the fans encounters the lower layer of surface elements 74, passes through the gaps between the surface elements 74, and is diffused against the bottom of the surface elements 74 above them. In addition, because surface elements 74 are open sided, air can flow over surface elements 74, including the liquid flowing over the surface elements 74. This diffusion pattern occurs in and continues through the multiple layers of surface elements 74 so that at the top of the liquid collection assembly 20 the air is diffused over the area of the flow passage 72 for uniform flow through the fill media 18 and uniform heat transfer. As also seen in FIG. 13, surface elements 74 in each layer are laterally spaced from one another and offset relative to the surface elements 74 in the layer above or below it. The space between the ends of the surface elements 74 in each layer is less than the width of the surface elements 74 themselves increasing the opportunity for the surface elements 74 to collect liquid flowing down towards the fans 22 as mist or droplets through the liquid collection assembly 20.

It is to be understood that the uniform spacing of the surface elements 74 described above is not mandatory. Depending upon the application or the specific shape of the housing, it is within the scope of the inventive concepts to vary the spacing between the surface elements 74 to direct air flow to specific areas. In addition, varying the size of the openings between adjacent surface elements 74 will affect the air velocity between the surface elements 74. By varying the gap between them, air distribution can be better balanced throughout the system. However, the surface elements 74 should remain overlapped, so liquid cannot escape to the fans.

While varying the spacing between the surface elements 74 can effectively direct air flow laterally relative to the surface elements 74, it may be desirable to selectively direct air flow in a direction parallel to the surface elements 74. The width of the air diverter 76 can be varied along the length of the surface elements 74. In one embodiment, a diverter element 97 (FIG. 12C) can be connected to the flow diverter to in effect increase the width of the flow diverter at selected areas along the length of the surface elements 74. The diverter elements 97 can be formed to have any length and any shape but in one version, the diverter elements 97 are similar in shape to the flow diverter and greater in lateral dimension.

Figure 14:
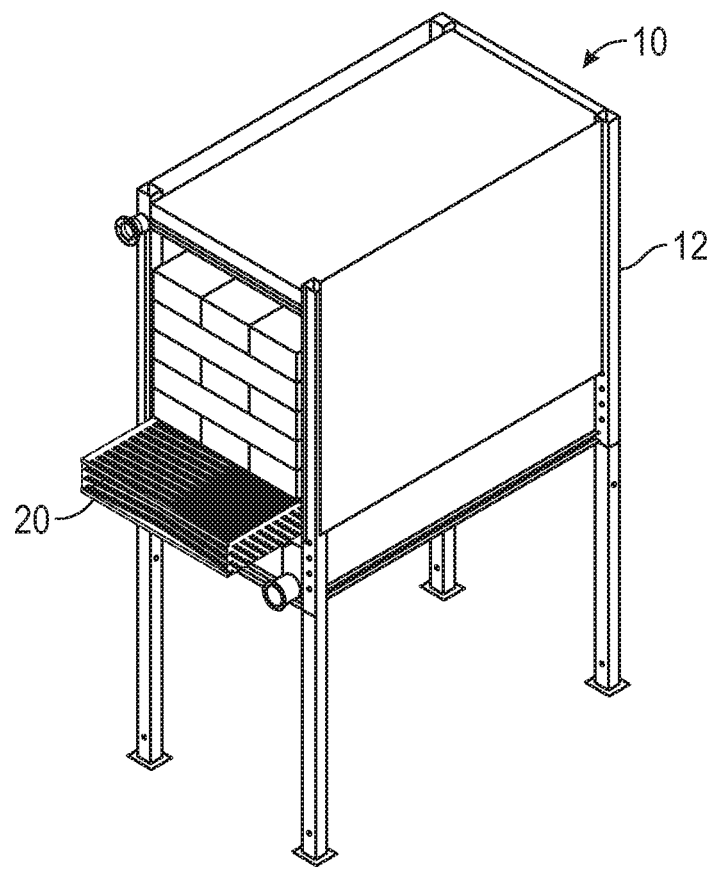
FIG. 14 is a perspective view of the cooling tower module showing the liquid collection assembly being installed and/or removed as a unit.

The liquid collection assembly 20 is supported by the structure forming the first gutter 44 and the second gutter 46. As shown in FIG. 4, the liquid collection basin 42 may be provided with parallel tracks 98 for slidingly supporting the liquid collection assembly 20. FIG. 14 shows the end wall 28 removed and the liquid collection assembly 20 in the process of being installed in the housing assembly 12 or removed from the housing assembly 12 as a unit.

Figure 15A:
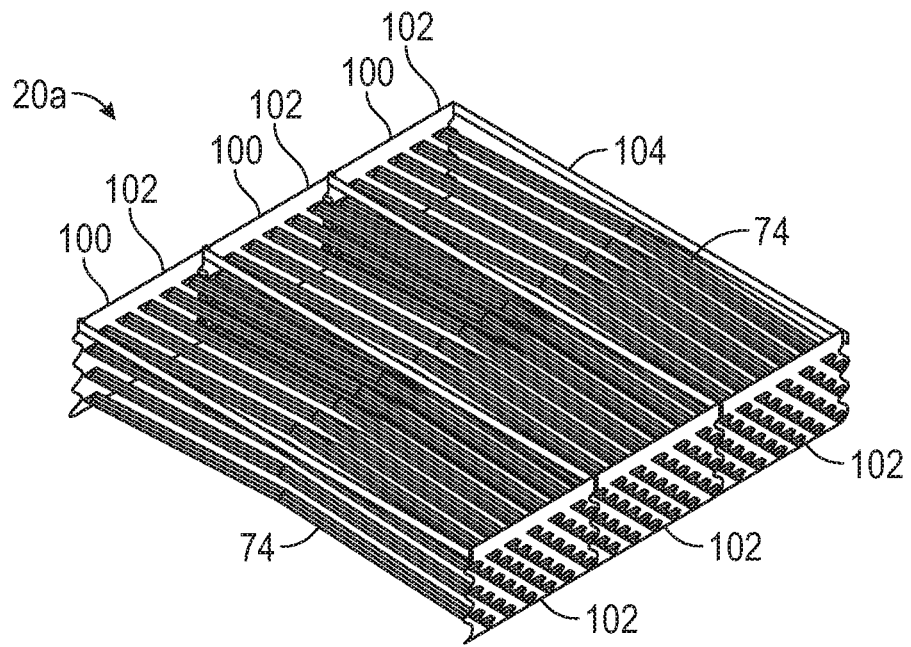
FIG. 15A is a perspective view of another embodiment of a liquid collection assembly shown in an assembled condition.
Figure 15B:
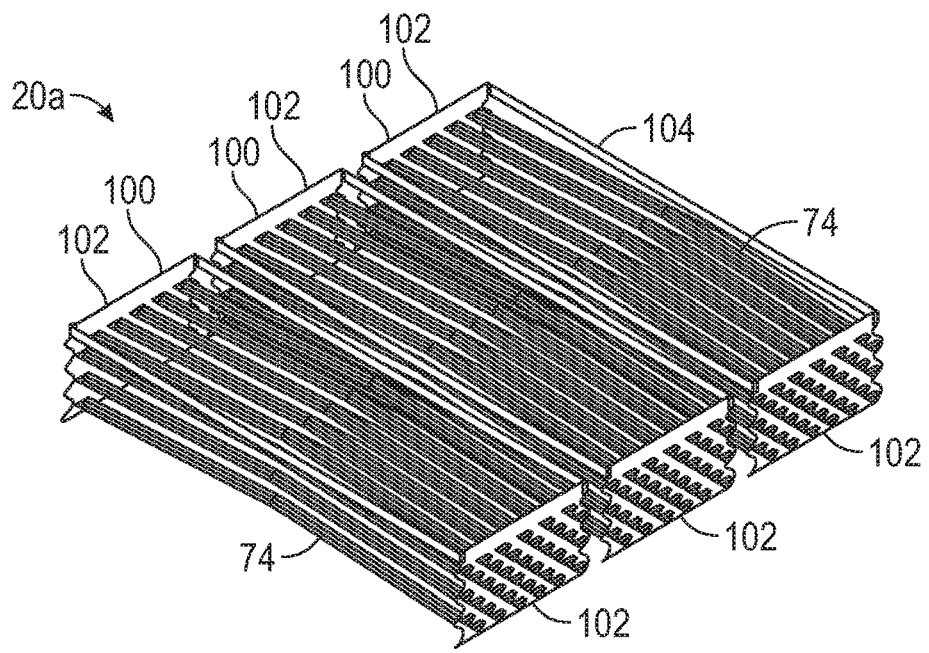
FIG. 15B is a perspective view of the liquid collection assembly of FIG. 15A shown in an exploded condition.

In another embodiment, the liquid collection assembly 20 may be installed and removed in sections. FIGS. 15A and 15B illustrate another embodiment of a liquid collection assembly 20a that includes liquid collection assembly sections 100. The liquid collection assembly sections 100 include side walls 102, supported by longitudinal support members 104, and a plurality of surface elements 74 supported between the side walls 102. The edges of the side walls 102 are configured to mate with a side wall 102 of an adjacent liquid collection section when abutted with one another to form a fluid tight seal. In one embodiment, opposing edges of the side walls 102 may be provided with a tongue and groove structure to permit adjacent sections to mate with one another. The end sections may be provided with one side wall to form a perimeter housing when the sections are assembled.

Figure 16:
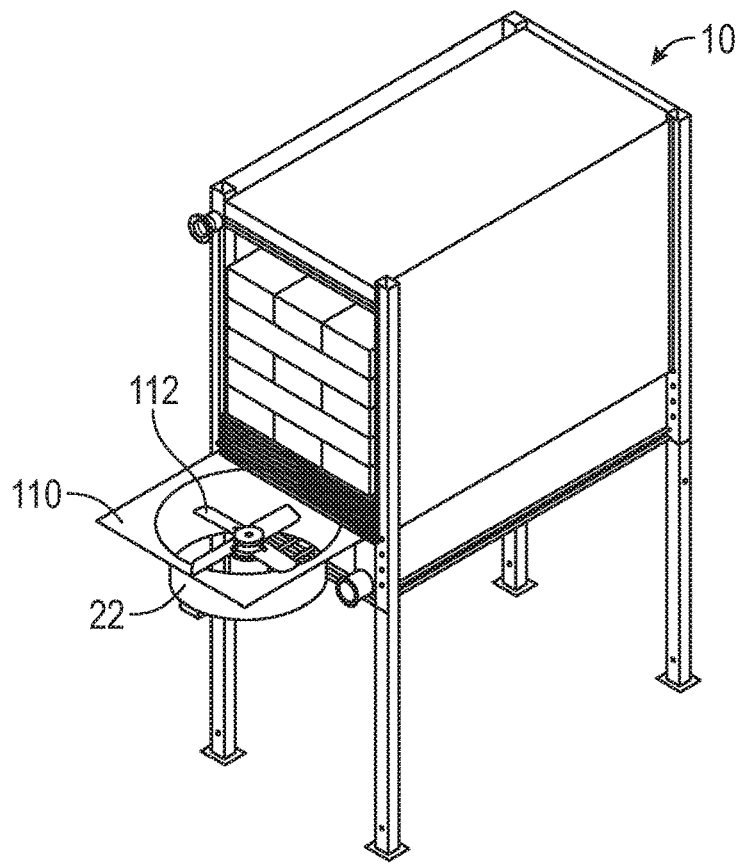
FIG. 16 is a perspective view of the cooling tower module showing a fan assembly being installed and/or removed as a unit.

Referring to FIG. 16, the fan assemblies 22 include a shroud 110 and a fan 112, which are received in the fan receiving space 50 and 52. Like the liquid collection assembly 20, the fan assemblies 22 may be installed in the housing assembly 12 or removed from the housing assembly 12 as a unit.

Referring now to FIGS. 17-20, another embodiment of a liquid collection assembly 20a is illustrated. The liquid collection assembly 20a is positioned within the housing assembly 12 below the fill media 18 for collecting liquid that passes from the liquid distribution assembly 16 and through the fill media 18. The liquid collection assembly 20a includes a perimeter housing 70a, which defines a vertical flow passage 72a, and a plurality of surface elements 110 supported within the flow passage 72a to allow air to pass from the fan assembly 22 and through the flow passage 72a and to collect liquid falling into the flow passage 72a and to direct the collected water to the first and second gutters 44 and 46. The perimeter housing 70a has a pair of end walls 112 and a plurality of cross members 114. The cross members 114 support the end walls 112 and provide support for the fill media 18.

The surface elements 110 are troughless, open sided members that provide a planar surface on which liquid falls.

The term "troughless" means the surface element contains no structure on an upper surface thereof capable of holding or containing liquid. In one embodiment, the surface elements 110 are flat slats supported in an overlapping, stair step arrangement. The surface elements 110 are angled so gravity is utilized to carry the liquid down a series of the surface elements 110 and into one of the gutters 44 and 46. The surface elements 110 may be fabricated of a metal or sufficiently rigid plastic material. If fabricated of a plastic material, the surface element 110 may further include a fireproof cover (not shown) shaped to conform to the contour of surface element 110. The cover can be fabricated of a metal.

Figure 17:
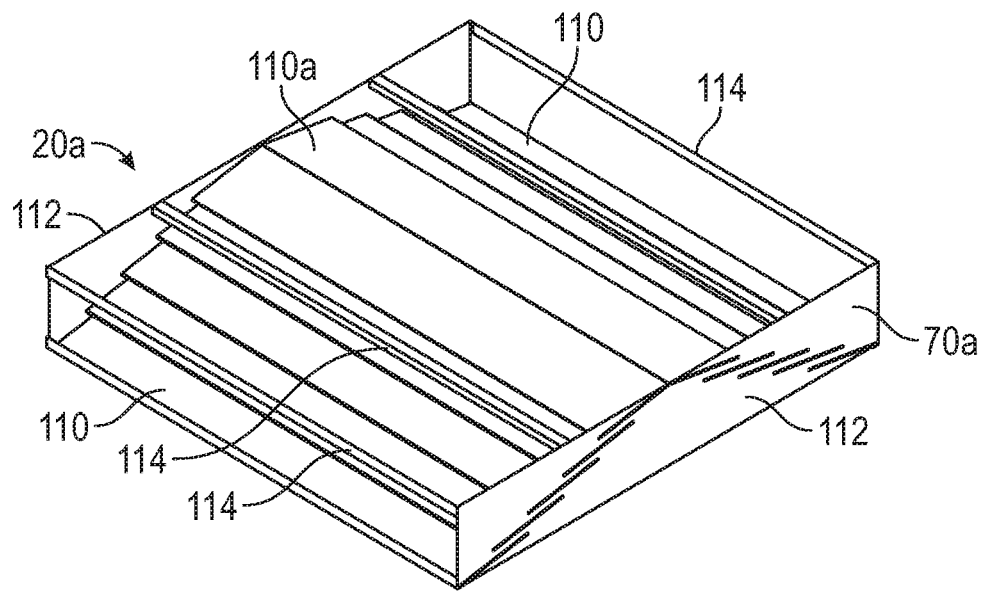
FIG. 17 is a perspective view of another embodiment of a liquid collection assembly.
Figure 18:
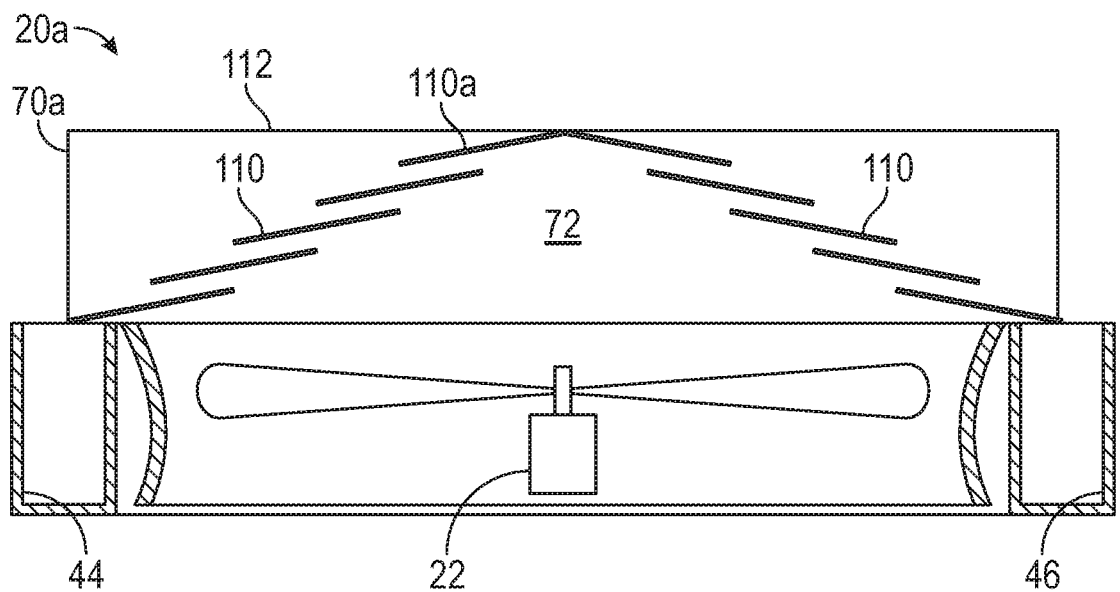
FIG. 18 is a sectional view of the liquid collection assembly of FIG. 17.

As shown in FIGS. 17 and 18, the surface elements 110 are supported and arranged in a single layer forming an inverted V. The surface elements 110 intercept the liquid passing through the flow passage 72a and direct it away from the fan assembly 22. Liquid falling onto one side of the inverted V flows toward one gutter and liquid falling onto the other side flows toward the other gutter. To facilitate the division of flow between the two sides, the liquid collection assembly 20a includes a surface element 110a having an inverted V shape.

By forming the surface elements 110 in a single layer, the air from the fan assembly 22 is met with less resistance, thereby reducing the energy needs of the fan assembly 22. Desirably, the surface elements 110 and 110a require no intermediate support, which would interfere with the flow of air and liquid through the cooling tower module. Nevertheless, supports may be used. By way of example, the supports may be in the form of cross members, spacers between adjacent surface elements, and/or hangars.

As illustrated in FIGS. 17 and 18, the ends of the surface elements 110 are connected to the end walls 112 and angled so the liquid traveling down the surface elements 110 travels parallel to the end walls 112 and passes into the gutters 44 and 46, which are positioned beneath the lowermost support elements 110. The gutters 44 and 46 carry the liquid to the outlet where it can be recirculated.

In another embodiment, the surface elements 110 may be supported and arranged in a single layer so the surface elements angle downwardly from one side wall to the opposing side wall. In this embodiment, liquid will enter the liquid basin via only one gutter.

FIG. 18 illustrates the array of the surface elements 110. The air flowing from the fan assembly 22 encounters the lower surface of the surface elements 110, 110a and passes through the gaps between the surface elements 110, 110a. In addition, because the surface elements 110, 110a are open sided, air can flow over surface elements 110, including the liquid flowing over the surface elements 110, 110a. As also seen in FIG. 18, the surface elements 110, 110a may be uniformly vertically and laterally spaced from one another. However, uniform spacing of the surface elements 110, 110a is not mandatory. Depending upon the application or the specific shape of the housing, it is within the scope of the inventive concepts to vary the spacing between the surface elements 110, 110a to direct air flow to specific areas. In addition, varying the size of the openings between adjacent surface elements 110 will affect the air velocity between the surface elements 110, 110a. By varying the gap between them, air distribution can be better balanced throughout the system. The width of the surface elements 110, 110a can also be varied to affect the size of the gap.

In one embodiment, the width of the surface elements 110 and the width of one-half of the surface element 110a are 12 inches. The spacing between the surface elements 110 and 110a can vary from top to bottom. By way of example, the surface elements 110 and 110a can be spaced from top to bottom at intervals of 1¼ inches, 1½ inches, 1¾ inches, and 2 inches. The surface elements 110a and 110 can overlap about fifty percent of the adjacent surface element 110.

The liquid collection assembly 20a is supported by the structure forming the first gutter 44 and the second gutter 46. As described above, the liquid collection basin may be provided with parallel tracks 98 for slidingly supporting the liquid collection assembly.

Figure 19:
FIG. 19 is an end view a surface element.

FIG. 19 illustrated another embodiment of a surface element 110b. The surface element 110b may be provided with one or more bends 111a and 111b to increase structural integrity. The bends 111a and 111b are provided along a portion of the surface elements 110 that is positioned vertically beneath an adjacent surface element 110b. The bend 111b is near an upper end of the surface element 110b and angled downwardly so the bend 111b forms an air vane 111c to direct the flow of air from the fan assembly 22 between the surface elements 110b.

Figure 20:
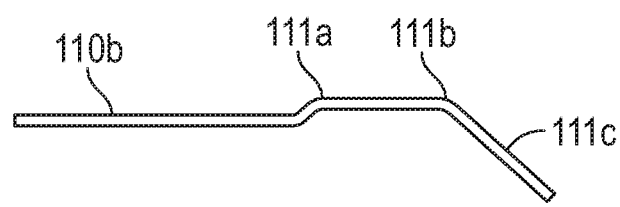
FIG. 20 is an end view of another embodiment of a surface element.
Figure 21:
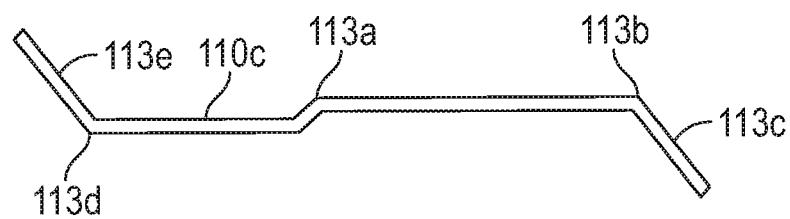
FIG. 21 is an end view of another embodiment of a surface element.

FIGS. 20 and 21 illustrate another embodiment of a surface element 110c. Like the surface element 110b, the surface element 110c has one or more bends 113a and 113b to increase structural integrity. The bends 113a and 113b are provided along a portion of the surface elements 110c that is positioned vertically beneath an adjacent surface element 110c. The bend 113b is toward an upper end of the surface element 110c and directed downwardly so the bend 113b forms an air vane 113c to direct the flow of air from the fan assembly 22 between the surface elements 110c.

The surface element 110c further has a bend 113d near a lower end thereof. The bend 113d is angled upwardly so the bend 111b forms an air vane 113e. As shown in FIG. 21, the air vane 113e has a plurality of openings 115 to permit the passage of liquid.

Figure 22:
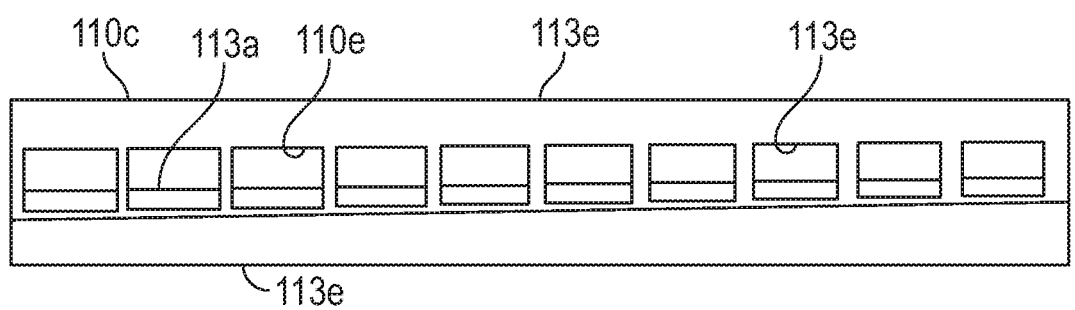
FIG. 22 is a front elevational view of the surface element of FIG. 21.

FIGS. 21 and 22 illustrate another embodiment of a liquid collection assembly 20b together with another embodiment of a housing assembly 12a. The housing assembly 12a is similar to the housing assembly 12 described above, except as described below. The housing assembly 12a includes an integrally constructed generally rectangular parallelepiped shaped frame 120 having first, second, third and fourth sides 122, 124, 126, and 128 and having a bottom 130 which flares upward to define a fan inlet duct 132. The frame 120 is shown as a unitary fiberglass member (i.e., fiber reinforced plastic) molded as a single piece. The frame 120 may also be constructed by joining two or more separately molded fiberglass pieces.

The housing assembly 12a includes a liquid collection basin 134 formed to collect water from the liquid collection assembly 20b as described below. The liquid collection basin 134 may include an annular gutter 136 formed by the first, second, third and fourth sides 122, 124, 126, and 128, the bottom 130, and the fan inlet duct 132. The gutter 136 is provided with a liquid outlet (not shown).

The liquid collection assembly 20b is positioned within the housing assembly 12a below the fill media 18 for collecting liquid that passes from the liquid distribution assembly 16 and through the fill media 18. The liquid collection assembly 20b includes a monolithic, troughless surface element 140 supported above the fan inlet duct 132 to allow air to pass from the fan assembly 22 and to collect and direct the falling liquid to the gutter 136.

The surface element 140 is a conical, open sided member that provides a single surface on which liquid falls and gravity is utilized to carry the liquid down the surface element 140 and into the gutter 136. In one embodiment, the surface element 140 may be fabricated of a metal or sufficiently rigid plastic material.

The surface element 140 is sized to extend radially beyond the fan inlet duct 132 to prevent liquid from passing to the fan assembly 22. The surface element 140 is supported above the fan inlet duct 132 in a spaced apart relationship to form a substantially annular flow passage 142 between the surface element 140 and the fan inlet duct 132. The surface element 140 can be supported with a plurality of brackets 144 spaced around the circumference of the surface element 140. Water collects on the surface element 140 and travels down the surface element 140 due to gravity to carry the liquid to the gutter 136.

Figure 23:
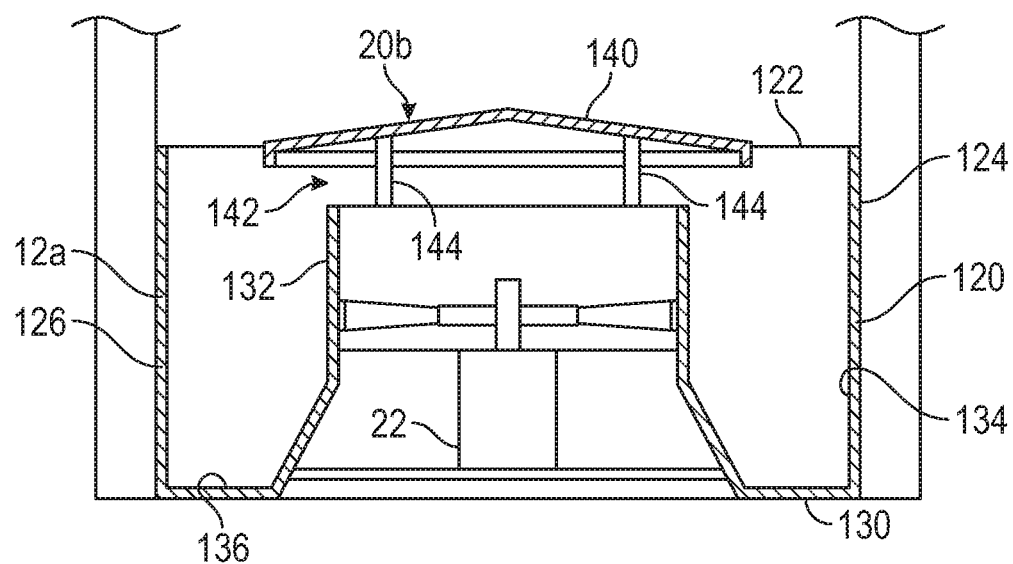
FIG. 23 is a sectional view of another embodiment of a housing assembly and a liquid collection assembly.
Figure 24:
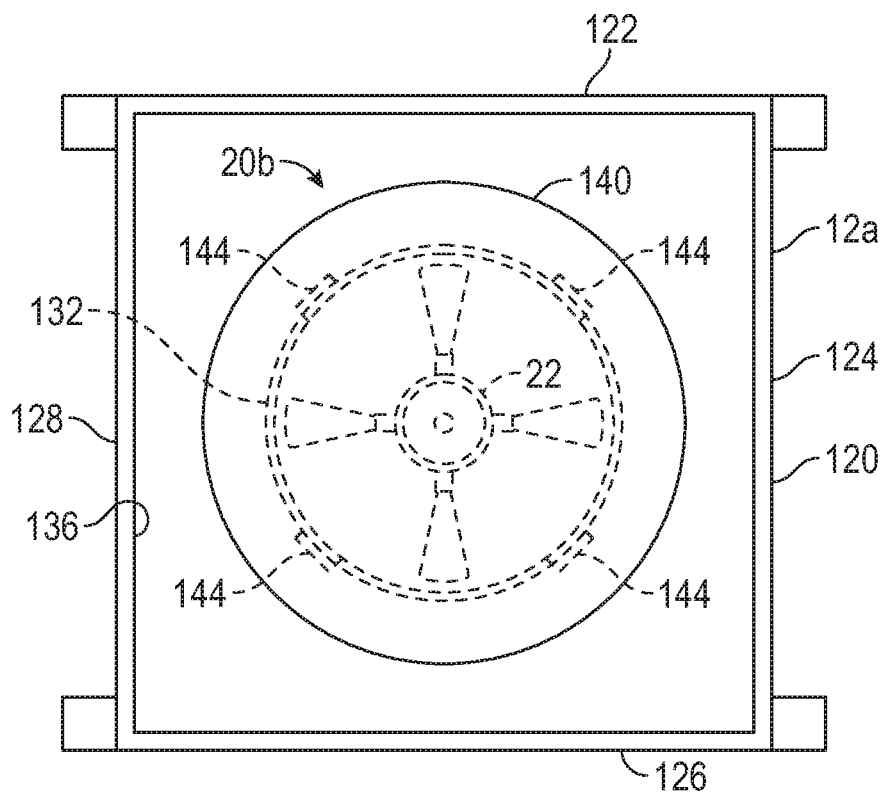
FIG. 24 is a top plan view of the housing and liquid collection assembly of FIG. 23.
Figure 25:
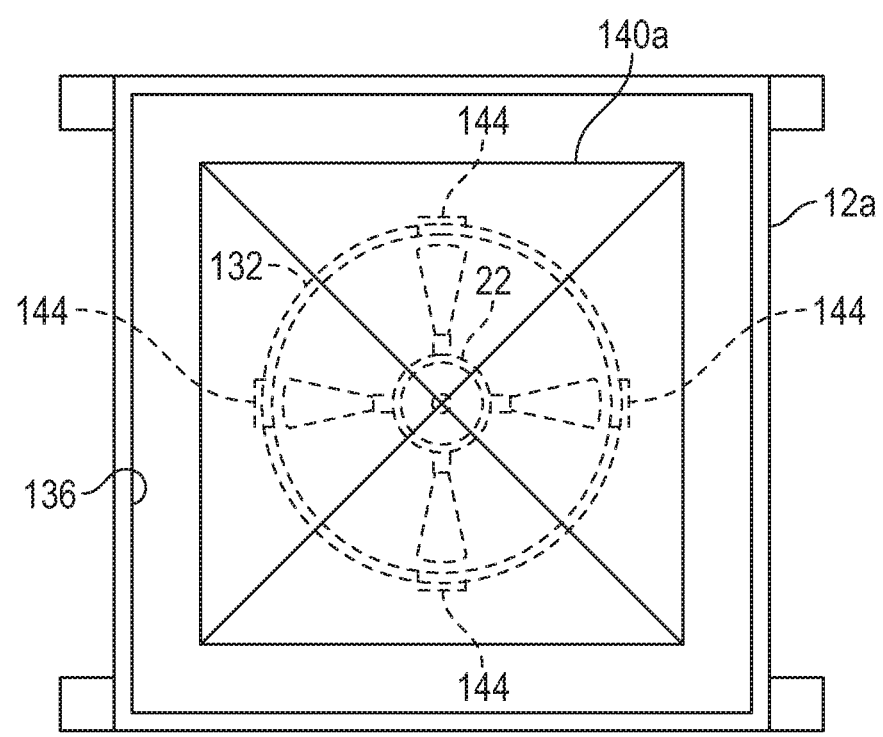
FIG. 25 is a top plan view of another embodiment of a liquid collection assembly.

FIG. 23 illustrates another embodiment of a surface element 140a. The surface element 140a is similar to the surface element 140, except the surface element 140a is a troughless, four-sided pyramidal member that provides a single surface on which liquid falls and gravity is utilized to carry the liquid down the surface element 140a and into the gutter 136. In one embodiment, the surface element 140a may be fabricated of a metal or sufficiently rigid plastic material.

The surface element 140a is sized to extend radially beyond the fan inlet duct 132 to prevent liquid from passing to the fan assembly 22. The surface element 140a is supported above the fan inlet duct 132 in a spaced apart relationship to form any annular flow passage between the surface element 140a and the fan inlet duct 132. The surface element 140a can be supported with a plurality of brackets 144 spaced around the circumference of the surface element 140a. Water collects on the surface element 140 and travels down the surface element 140a due to gravity to carry the liquid to the gutter 136.

While the liquid collection assembly 20b has been described combined with the housing assembly 12a, it should be appreciated that the liquid collection assembly 20b may be used with the housing assembly 12.

The liquid collection assembly 20a is supported by the structure forming the first gutter 44 and the second gutter 46. As described above, the liquid collection basin may be provided with parallel tracks 98 for slidingly supporting the liquid collection assembly.

Referring now to FIG. 26, another embodiment of a liquid collection assembly 20c is illustrated. The liquid collection assembly 20c is positioned within the housing assembly 12 below the fill media 18 for collecting liquid that passes from the liquid distribution assembly 16 and through the fill media 18. The liquid collection assembly 20c includes a perimeter housing 70b, which defines a vertical flow passage 72b, and a plurality of surface elements 150 supported within the flow passage 72b to allow air to pass from the fan assembly 22 and through the flow passage 72b and to collect liquid falling into the flow passage 72b and to direct the collected water to the first and second gutters 44 and 46. The perimeter housing 70b has a pair of end walls 152 and is similar in construction to the perimeter housing 70a except the end walls are provided with openings 154.

The surface elements 150 are similar in structure to surface elements 110c described above, except the surface elements 150 have an air vane 155 at a lower end thereof that is solid (i.e., the air vane 154 has no openings). As such, the air vane 155 cooperates with an opposing portion of the surface element 150 to form a trough 156 in which liquid falls. In one embodiment, the surface elements 150 are arranged in manner similar to the surface elements 110,110a described above. Like the surface elements 110c, the surface elements 150 have an air vane 158 to direct the flow of air from the fan assembly 22 between the surface elements 150.

The surface elements 150 are angled so gravity is utilized to carry liquid down into the trough 156 of each respective surface element 150 and in turn into one of the gutters 44 and 46. To this end, it will be appreciated that the liquid collection assembly 20c is positioned into the housing assembly 12 at with the end walls 152 positioned over the gutters 44 and 46. The surface elements 150 may be fabricated of a metal or sufficiently rigid plastic material. If fabricated of a plastic material, the surface element 150 may further include a fireproof cover (not shown) shaped to conform to the contour of surface element 150. The cover can be fabricated of a metal.

The surface elements 150 are supported and arranged in a single layer forming an inverted V. The surface elements 150 intercept the liquid passing through the flow passage 72a and direct it away from the fan assembly 22 via the troughs 156. To facilitate the division of flow between the two sides of the inverted V, the liquid collection assembly 20c includes a surface element 150a having an inverted V shape.

By forming the surface elements 150 in a single layer, the air from the fan assembly 22 is met with less resistance, thereby reducing the energy needs of the fan assembly 22. Desirably, the surface elements 150 and 150a require no intermediate support, which would interfere with the flow of air and liquid through the cooling tower module. Nevertheless, supports may be used. By way of example, the supports may be in the form of cross members, spacers between adjacent surface elements, and/or hangars.

Each trough 156 is in communication with at least one of the openings 154 so that liquid passes into one of the gutters 44 and 46. The ends of the surface elements 150 and 150a are connected to the end walls 152 and angled so the liquid traveling down the surface elements 150, 150a travels perpendicular to the end walls 152 and passes into the gutters 44 and 46, which are positioned beneath end walls 152. The gutters 44 and 46 carry the liquid to the outlet where it can be recirculated.

In another embodiment, the surface elements 110 may be supported and arranged in a single layer so the surface elements 150 angle downwardly along the entirety of length of the end walls 152.

The air flowing from the fan assembly 22 encounters the lower surface of the surface elements 150, 150a and passes through the gaps between the surface elements 150, 150a. The surface elements 150, 150a may be uniformly vertically and laterally spaced from one another. However, uniform spacing of the surface elements 150, 150a is not mandatory. Depending upon the application or the specific shape of the housing, it is within the scope of the inventive concepts to vary the spacing between the surface elements 150, 150a to direct air flow to specific areas. In addition, varying the size of the openings between adjacent surface elements 150 will affect the air velocity between the surface elements 150, 150a. By varying the gap between them, air distribution can be better balanced throughout the system. The width of the surface elements 150, 150a can also be varied to affect the size of the gap.

In one embodiment, the width of the surface elements 150 and the width of one-half of the surface element 150a are about 12 inches. The spacing between the surface elements 150 and 150a can vary from top to bottom. By way of example, the surface elements 150 and 150a can be spaced from top to bottom at intervals of 1¼ inches, 1½ inches, 1¾ inches, and 2 inches. The surface elements 150a and 150 can overlap about fifty percent of the adjacent surface element 110.

Although the inventive concepts have been illustrated and described in connection with compact, transportable cooling towers, the inventive concepts disclosed herein are equally adapted to use in fluid coolers. In fluid coolers liquid is passed countercurrent across a coil (i.e., heat exchanger) carrying a liquid to be cooled. Also, although the liquid collection assembly has been illustrated and described in connection with compact, transportable cooling towers with bottom fan assemblies, the liquid collection assembly may be used in more conventional systems having conventional liquid sumps or basins below the liquid cooler or fill media.

The inventive concepts disclosed provide several major improvements. The liquid collection system collects the down coming liquid, but also directs and diffuses the up flowing air so that all the fill media gets substantially equal air flow across the entire surface of the heat exchanger or fill media. This enhances more efficient air to liquid mixtures which increases performance of the system. In addition, the design of the liquid collection assemblies reduces the pressure drop across the surface elements, as compared to existing technology. The reduced pressure drop also increases thermal performance of the cooling tower. The liquid collection assembly is relatively simple and economical to manufacture.

In operation, the liquid to be cooled is distributed across the body of fill material with the liquid distribution assembly. That liquid falls downward through the fill material and then is intercepted by the surface elements. That liquid then travels down the surface elements into contact the respective side walls and falls into the respective gutters.

From the above description, it is clear that the inventive concepts disclosed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed.

What is claimed is:

1. An apparatus, comprising:
    a housing having at least one gutter;
    a body of fill material disposed in the housing;
    a liquid distribution system disposed in the housing and positioned above the fill material for distributing liquid on top of the fill material so the liquid gravitates downward through the fill material;
    a fan positioned below the body of fill material for blowing air upward through the fill material; and
    a liquid collection assembly positioned between the fill material and the fan for collecting the liquid gravitating through the fill material while allowing air to pass up to the fill material, the liquid collection assembly having at least one troughless, open sided surface element angled so gravity is utilized to capture the down flowing liquid to provide a barrier between the fill media and the fan and to carry the liquid down the surface element and into the at least one gutter.

2. The apparatus of claim 1, wherein the liquid collection assembly comprises a plurality of troughless, open sided surface elements arranged in a single layer, the surface elements angled so gravity is utilized to carry the liquid down the surface elements and into the at least one gutter, each surface element vertically offset from an adjacent surface element to capture the down flowing liquid to provide a barrier between the fill media and the fan.

3. The apparatus of claim 1, wherein the liquid collection assembly comprises a plurality of troughless, open sided surface elements arranged in a single layer forming an inverted V, the surface elements angled so gravity is utilized to carry the liquid down the surface elements and into the at least one gutter, each surface element vertically offset from an adjacent surface element to capture the down flowing liquid to provide a barrier between the fill media and the fan.

4. The apparatus of claim 1, wherein the liquid collection assembly comprises a single troughless, open sided surface element, the surface element angled so gravity is utilized to carry the liquid down the surface element and into the at least one gutter.

5. The apparatus of claim 4, wherein the vertical spacing between the surface elements increases from an upper end of the liquid collection assembly to a lower end of the liquid collection assembly.

6. The apparatus of claim 3, wherein the surface element is a conical, open sided member that provides a single surface on which liquid falls and gravity is utilized to carry the liquid down the surface element and into at least one gutter.

7. The apparatus of claim 6, wherein the gutter is annularly shaped.

8. The apparatus of claim 3, wherein the surface element is a four-sided pyramidal, open sided member that provides a single member on which liquid falls and gravity is utilized to carry the liquid down the surface element and into at least one gutter.

9. The apparatus of claim 8, wherein the gutter is annularly shaped.

10. The apparatus of claim 1, wherein the liquid distribution assembly comprises:
    a liquid distribution header;
    at least one feeder conduit; and
    a four-plex header assembly, one end of the feeder conduit is connected to the liquid distribution header and an opposing end of the feeder conduit is connected to the four-plex header assembly, the four-plex header assembly has a central base header having four holes equally spaced about the circumference of the base header, the holes sized to receive lateral conduits; and
    a plurality of nozzle assemblies connected to the lateral conduits to discharge liquid therethrough and over the fill media,
    wherein the lateral conduits are connected to the base header so the position of the lateral conduits relative to the base header is adjustable.

11. The apparatus of claim 10, wherein the housing assembly includes a frame supporting vertical side walls and end walls, the frame includes a plurality lower horizontal beams, a plurality of vertical beams, and a plurality of upper horizontal beams connected together to form a support frame, one of the upper horizontal formed as a liquid conduit and sealed relative to the adjacent vertical beams to be the liquid distribution header of the liquid distribution assembly.

12. An apparatus, comprising:
    a housing having at least one gutter;
    a liquid distribution system disposed in the housing;
    a fan positioned below the liquid distribution system for blowing air upward toward the liquid distribution system; and
    a liquid collection assembly positioned between the liquid distribution system and the fan for collecting the liquid passing from the liquid distribution system while allowing air to pass through the liquid collection assembly and up toward the liquid distribution system, the liquid collection assembly having at least one troughless, open sided surface element angled so gravity is utilized to capture the down flowing liquid to provide a barrier between the liquid distribution system and the fan and to carry the liquid down the surface element and into the at least one gutter.

13. The apparatus of claim 12, wherein the liquid collection assembly comprises a plurality of troughless, open sided surface elements arranged in a single layer, the surface elements angled so gravity is utilized to carry the liquid down the surface elements and into the at least one gutter, each surface element vertically offset from an adjacent surface element to capture the down flowing liquid to provide a barrier between the liquid distribution system and the fan.

14. The apparatus of claim 12, wherein the liquid collection assembly comprises a plurality of troughless, open sided surface elements arranged in a single layer as an inverted V, the surface elements angled so gravity is utilized to carry the liquid down the surface elements and into the at least one gutter, each surface element vertically offset from an adjacent surface element to capture the down flowing liquid to provide a barrier between the liquid distribution system and the fan.

15. The apparatus of claim 12, wherein the liquid collection assembly comprises a single troughless, open sided surface element, the surface element angled so gravity is utilized to carry the liquid down the surface element and into the at least one gutter.

16. The apparatus of claim 15, wherein the vertical spacing between the surface elements increases from an upper end of the liquid collection assembly to a lower end of the liquid collection assembly.

17. The apparatus of claim 15, wherein the surface element is a conical, open sided member that provides a single surface on which liquid falls and gravity is utilized to carry the liquid down the surface element and into at least one gutter.

18. The apparatus of claim 17, wherein the gutter is annularly shaped.

19. The apparatus of claim 15, wherein the surface element is a four-sided pyramidal, open sided member that provides a single member on which liquid falls and gravity is utilized to carry the liquid down the surface element and into at least one gutter.

20. The apparatus of claim 19, wherein the gutter is annularly shaped.

21. The apparatus of claim 12, wherein the liquid distribution assembly comprises:
 a liquid distribution header;
 at least one feeder conduit; and
 a four-plex header assembly, one end of the feeder conduit is connected to the liquid distribution header and an opposing end of the feeder conduit is connected to the four-plex header assembly, the four-plex header assembly has a central base header having four holes equally spaced about the circumference of the base header, the holes sized to receive lateral conduits; and
 a plurality of nozzle assemblies connected to the lateral conduits to discharge liquid therethrough,
 wherein the lateral conduits are connected to the base header so the position of the lateral conduits relative to the base header is adjustable.

22. The apparatus of claim 21, wherein the housing assembly includes a frame supporting vertical side walls and end walls, the frame includes a plurality lower horizontal beams, a plurality of vertical beams, and a plurality of upper horizontal beams connected together to form a support frame, one of the upper horizontal formed as a liquid conduit and sealed relative to the adjacent vertical beams to be the liquid distribution header of the liquid distribution assembly.

23. An apparatus, comprising:
 a housing having at least one gutter;
 a liquid distribution system disposed in the housing;
 a fan positioned below the liquid distribution system for blowing air upward toward the liquid distribution system; and
 a liquid collection assembly positioned between the liquid distribution system and the fan for collecting the liquid passing from the liquid distribution system while allowing air to pass through the liquid collection assembly and up toward the liquid distribution system, the liquid collection assembly having a plurality of troughs arranged in a single layer forming an inverted V, each surface element vertically offset from an adjacent surface element to capture the down flowing liquid to provide a barrier between the liquid distribution system and the fan and to carry the liquid into the at least one gutter.

* * * * *